United States Patent
Cackowski et al.

(10) Patent No.: US 9,332,036 B2
(45) Date of Patent: May 3, 2016

(54) METHODS, SYSTEMS, AND COMPUTER READABLE MEDIA FOR PROVIDING USER RECEPTIVITY DRIVEN POLICY IN A COMMUNICATIONS NETWORK

(75) Inventors: David Cackowski, Hillsborough, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 58 days.

(21) Appl. No.: 13/274,936

(22) Filed: Oct. 17, 2011

(65) Prior Publication Data
US 2012/0096139 A1    Apr. 19, 2012

Related U.S. Application Data

(60) Provisional application No. 61/393,853, filed on Oct. 15, 2010.

(51) Int. Cl.
*G06F 15/173* (2006.01)
*H04L 29/06* (2006.01)
(Continued)

(52) U.S. Cl.
CPC ...... *H04L 65/1016* (2013.01); *G06F 17/30525* (2013.01); *H04L 65/1046* (2013.01); *H04L 65/1069* (2013.01); *H04L 65/80* (2013.01); *H04M 15/66* (2013.01)

(58) Field of Classification Search
CPC ........ H04L 41/50; H04L 41/12; G06F 15/173
USPC ........................... 709/223, 224, 225, 226, 203
See application file for complete search history.

(56) References Cited

U.S. PATENT DOCUMENTS 3,917,915 A    11/1975    Karras
4,162,377 A    7/1979    Mearns
(Continued)

FOREIGN PATENT DOCUMENTS

EP    0 088 639    9/1983
EP    0 212 654    5/1987
(Continued)

OTHER PUBLICATIONS

"3rd Generation Partnership Project; Technical Specification Group Core Network and Terminals; Policy and Charging Control over Gx reference point (Release 9)," 3GPP TS 29.212 V9.2.0 (Mar. 2010).
(Continued)

*Primary Examiner* — Vivek Srivastava
*Assistant Examiner* — Normin Abedin
(74) *Attorney, Agent, or Firm* — Jenkins, Wilson, Taylor & Hunt, P.A.

(57) ABSTRACT

Methods, systems, and computer readable media for providing user receptivity driven policy in a communications network are disclosed. The method includes storing subscriber preference information indicating a willingness of a subscriber to receive a first type of content as well as policy and charging enhancement information associated with the subscriber preference information. Content is received from a content provider. Based on the subscriber preference information, it is determined whether the subscriber is willing to receive the content. In response to determining that the subscriber is willing to receive the content, the content is communicated to the subscriber and a policy and charging rules function (PCRF) is communicated with for temporarily enhancing a network or charging policy of the subscriber based on the policy charging enhancement information.

14 Claims, 11 Drawing Sheets

(51) Int. Cl.
*G06F 17/30* (2006.01)
*H04M 15/00* (2006.01)

(56) References Cited

U.S. PATENT DOCUMENTS

| | | |
|---|---|---|
| 4,191,860 A | 3/1980 | Weber |
| 4,310,727 A | 1/1982 | Lawser |
| 4,313,035 A | 1/1982 | Jordan et al. |
| 4,385,206 A | 5/1983 | Bradshaw et al. |
| 4,754,479 A | 6/1988 | Bicknell et al. |
| 4,756,020 A | 7/1988 | Fodale |
| 4,769,834 A | 9/1988 | Billinger et al. |
| 4,788,718 A | 11/1988 | McNabb et al. |
| 4,897,835 A | 1/1990 | Gaskill et al. |
| 4,897,870 A | 1/1990 | Golden |
| 4,959,849 A | 9/1990 | Bhusri |
| 4,972,461 A | 11/1990 | Brown et al. |
| 5,008,929 A | 4/1991 | Olsen et al. |
| 5,150,357 A | 9/1992 | Hopner et al. |
| 5,291,481 A | 3/1994 | Doshi et al. |
| 5,315,580 A | 5/1994 | Phaal |
| 5,341,608 A | 8/1994 | Mains, Jr. |
| 5,402,474 A | 3/1995 | Miller et al. |
| 5,426,688 A | 6/1995 | Anand |
| 5,430,709 A | 7/1995 | Galloway |
| 5,438,570 A | 8/1995 | Karras et al. |
| 5,457,692 A | 10/1995 | Ishinabe et al. |
| 5,457,729 A | 10/1995 | Hamann et al. |
| 5,473,596 A | 12/1995 | Garafola et al. |
| 5,475,732 A | 12/1995 | Pester, III |
| 5,506,893 A | 4/1996 | Buscher et al. |
| 5,521,902 A | 5/1996 | Ferguson |
| 5,539,804 A | 7/1996 | Hong et al. |
| 5,546,398 A | 8/1996 | Tucker et al. |
| 5,550,914 A | 8/1996 | Clarke et al. |
| 5,572,579 A | 11/1996 | Orriss et al. |
| 5,579,371 A | 11/1996 | Aridas et al. |
| 5,583,926 A | 12/1996 | Venier et al. |
| 5,586,177 A | 12/1996 | Farris et al. |
| 5,592,530 A | 1/1997 | Brockman et al. |
| 5,598,464 A | 1/1997 | Hess et al. |
| 5,602,909 A | 2/1997 | Carkner et al. |
| 5,606,600 A | 2/1997 | Elliott |
| 5,610,969 A | 3/1997 | McHenry et al. |
| 5,610,977 A | 3/1997 | Williams et al. |
| 5,625,681 A | 4/1997 | Butler, II |
| 5,689,555 A | 11/1997 | Sonnenberg |
| 5,696,816 A | 12/1997 | Sonnenberg |
| 5,712,908 A | 1/1998 | Brinkman et al. |
| 5,740,239 A | 4/1998 | Bhagat et al. |
| 5,757,895 A | 5/1998 | Aridas et al. |
| 5,764,745 A | 6/1998 | Chan et al. |
| 5,768,352 A | 6/1998 | Elliott et al. |
| 5,768,358 A | 6/1998 | Venier et al. |
| 5,771,284 A | 6/1998 | Sonnenberg |
| 5,774,532 A | 6/1998 | Gottlieb et al. |
| 5,784,443 A | 7/1998 | Chapman et al. |
| 5,796,813 A | 8/1998 | Sonnenberg |
| 5,802,145 A | 9/1998 | Farris et al. |
| 5,812,639 A | 9/1998 | Bartholomew et al. |
| 5,867,558 A | 2/1999 | Swanson |
| 5,903,726 A | 5/1999 | Donovan et al. |
| 5,949,871 A | 9/1999 | Kabay et al. |
| 5,999,525 A | 12/1999 | Krishnaswamy et al. |
| 6,009,160 A | 12/1999 | Sonnenberg |
| 6,021,126 A | 2/2000 | White et al. |
| 6,028,914 A | 2/2000 | Lin et al. |
| 6,091,957 A | 7/2000 | Larkins et al. |
| 6,091,959 A | 7/2000 | Souissi et al. |
| 6,094,573 A | 7/2000 | Heinonen et al. |
| 6,097,719 A | 8/2000 | Benash et al. |
| 6,108,332 A | 8/2000 | Kasiviswanathan |
| 6,108,782 A | 8/2000 | Fletcher et al. |
| 6,111,946 A | 8/2000 | O'Brien |
| 6,115,754 A | 9/2000 | Landgren |
| 6,119,014 A | 9/2000 | Alperovich et al. |
| 6,128,304 A | 10/2000 | Gardell et al. |
| 6,128,377 A | 10/2000 | Sonnenberg |
| 6,134,307 A | 10/2000 | Broukman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,138,023 A | 10/2000 | Agarwal et al. |
| 6,181,937 B1 | 1/2001 | Joensuu |
| 6,182,086 B1 | 1/2001 | Lomet et al. |
| 6,188,752 B1 | 2/2001 | Lesley |
| 6,208,872 B1 | 3/2001 | Schmidt |
| 6,215,790 B1 | 4/2001 | Voit et al. |
| 6,219,551 B1 | 4/2001 | Hentila et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,333,931 B1 | 12/2001 | LaPier et al. |
| 6,363,411 B1 | 3/2002 | Dugan et al. |
| 6,373,930 B1 | 4/2002 | McConnell et al. |
| 6,393,269 B1 | 5/2002 | Hartmaier et al. |
| 6,424,621 B1 | 7/2002 | Ramaswamy et al. |
| 6,430,176 B1 | 8/2002 | Christie, IV |
| 6,438,223 B1 | 8/2002 | Eskafi et al. |
| 6,446,127 B1 | 9/2002 | Schuster et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,496,690 B1 | 12/2002 | Cobo et al. |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,584,183 B2 | 6/2003 | Manto |
| 6,611,516 B1 | 8/2003 | Pirkola et al. |
| 6,633,764 B1 | 10/2003 | Garcia |
| 6,718,178 B1 | 4/2004 | Sladek et al. |
| 6,747,970 B1 | 6/2004 | Lamb et al. |
| 6,760,343 B1 | 7/2004 | Krishnamurthy et al. |
| 6,801,781 B1 | 10/2004 | Provost et al. |
| 6,856,676 B1 | 2/2005 | Pirot et al. |
| 6,963,583 B1 | 11/2005 | Foti |
| 6,968,052 B2 | 11/2005 | Wullert, II |
| 7,058,036 B1 | 6/2006 | Yu et al. |
| 7,738,891 B2 | 6/2010 | Tenhunen et al. |
| 8,305,922 B2 | 11/2012 | Cuervo |
| 8,331,229 B1 | 12/2012 | Hu et al. |
| 8,620,263 B2 | 12/2013 | Ravishankar et al. |
| 8,681,622 B2 | 3/2014 | Chatterjee et al. |
| 8,903,974 B2 | 12/2014 | Rajagopalan et al. |
| 8,923,879 B2 | 12/2014 | Hu et al. |
| 8,996,670 B2 | 3/2015 | Kupinsky et al. |
| 2001/0031641 A1 | 10/2001 | Ung et al. |
| 2001/0034224 A1 | 10/2001 | McDowell et al. |
| 2002/0029189 A1 | 3/2002 | Titus et al. |
| 2002/0058507 A1 | 5/2002 | Valentine et al. |
| 2002/0111153 A1 | 8/2002 | Hartmaier et al. |
| 2002/0150079 A1 | 10/2002 | Zabawskyj et al. |
| 2003/0026289 A1 | 2/2003 | Mukherjee et al. |
| 2003/0031160 A1 | 2/2003 | Gibson Ang et al. |
| 2003/0037108 A1 | 2/2003 | Peiffer et al. |
| 2003/0177281 A1 | 9/2003 | McQuillan et al. |
| 2003/0203740 A1 | 10/2003 | Bahl et al. |
| 2004/0003037 A1 | 1/2004 | Fujimoto et al. |
| 2004/0153506 A1 | 8/2004 | Ito et al. |
| 2004/0166878 A1 | 8/2004 | Erskine et al. |
| 2004/0213393 A1 | 10/2004 | Bedingfiled et al. |
| 2004/0233840 A1 | 11/2004 | Bye |
| 2004/0240638 A1 | 12/2004 | Donovan |
| 2005/0027867 A1 | 2/2005 | Mueller et al. |

(56) References Cited

U.S. PATENT DOCUMENTS

| | | | |
|---|---|---|---|
| 2005/0070310 | A1 | 3/2005 | Caspi et al. |
| 2005/0202836 | A1 | 9/2005 | Schaedler et al. |
| 2006/0053197 | A1 | 3/2006 | Yoshimura et al. |
| 2006/0291488 | A1 | 12/2006 | Naqvi et al. |
| 2007/0185809 | A1 | 8/2007 | Duan |
| 2008/0168099 | A1* | 7/2008 | Skaf .......................... 707/104.1 |
| 2009/0172782 | A1* | 7/2009 | Taglienti et al. .................. 726/4 |
| 2009/0207730 | A1 | 8/2009 | Stamoulis et al. |
| 2009/0225719 | A1 | 9/2009 | Zhi et al. |
| 2009/0245108 | A1 | 10/2009 | Wu et al. |
| 2009/0327079 | A1* | 12/2009 | Parker .................... G06Q 30/02 705/14.55 |
| 2009/0327112 | A1 | 12/2009 | Li et al. |
| 2010/0137002 | A1 | 6/2010 | Agarwal et al. |
| 2010/0161802 | A1* | 6/2010 | Tofighbakhsh et al. ....... 709/226 |
| 2010/0184403 | A1 | 7/2010 | Cai et al. |
| 2010/0287121 | A1 | 11/2010 | Li et al. |
| 2011/0003579 | A1 | 1/2011 | Cai et al. |
| 2011/0158090 | A1 | 6/2011 | Riley et al. |
| 2011/0170411 | A1 | 7/2011 | Wang et al. |
| 2011/0170412 | A1 | 7/2011 | Ramadas et al. |
| 2011/0208853 | A1 | 8/2011 | Castro-Castro et al. |
| 2011/0217979 | A1 | 9/2011 | Nas |
| 2011/0231540 | A1 | 9/2011 | Tai et al. |
| 2011/0246586 | A1* | 10/2011 | Steele .......................... 709/206 |
| 2011/0307790 | A1 | 12/2011 | Pandya et al. |
| 2011/0317557 | A1 | 12/2011 | Siddam et al. |
| 2012/0026947 | A1 | 2/2012 | Miller et al. |
| 2012/0034900 | A1 | 2/2012 | Agarwal |
| 2012/0039175 | A1 | 2/2012 | Sridhar et al. |
| 2012/0052866 | A1 | 3/2012 | Froehlich et al. |
| 2012/0059943 | A1 | 3/2012 | Castro Castro et al. |
| 2012/0084371 | A1 | 4/2012 | Rajagopalan et al. |
| 2012/0094685 | A1 | 4/2012 | Marsico |
| 2012/0099715 | A1 | 4/2012 | Ravishankar et al. |
| 2012/0100849 | A1 | 4/2012 | Marsico |
| 2012/0129488 | A1 | 5/2012 | Patterson et al. |
| 2012/0140632 | A1 | 6/2012 | Norp et al. |
| 2012/0163297 | A1 | 6/2012 | Agarwal et al. |
| 2012/0176894 | A1 | 7/2012 | Cai et al. |
| 2012/0220330 | A1 | 8/2012 | Goldner et al. |
| 2012/0233325 | A1 | 9/2012 | Zhou et al. |
| 2012/0257499 | A1 | 10/2012 | Chatterjee et al. |
| 2013/0017803 | A1 | 1/2013 | Li et al. |
| 2013/0036215 | A1 | 2/2013 | Kupinsky et al. |

FOREIGN PATENT DOCUMENTS

| | | |
|---|---|---|
| EP | 0 258 654 | 3/1988 |
| EP | 0 264 023 | 4/1988 |
| EP | 1 100 279 A2 | 5/2001 |
| EP | 2 039 119 B1 | 8/2010 |
| GB | 2 382 267 | 5/2003 |
| JP | 58-215164 | 12/1983 |
| JP | 62-200859 | 9/1987 |
| KR | 1020030025024 A | 3/2003 |
| WO | WO 84/01073 | 3/1984 |
| WO | WO 86/03915 | 7/1986 |
| WO | WO 88/00419 | 1/1988 |
| WO | WO 97/33441 | 9/1997 |
| WO | WO 99/14910 | 3/1999 |
| WO | WO 00/16583 | 3/2000 |
| WO | WO 00/35155 A1 | 6/2000 |
| WO | WO 01/20920 A1 | 3/2001 |
| WO | WO 01/56308 A2 | 8/2001 |
| WO | WO 2006/031678 A2 | 3/2006 |
| WO | WO 2012/021344 A2 | 2/2012 |
| WO | WO 2013/126057 A1 | 8/2013 |

OTHER PUBLICATIONS

Non-Final Office Action for U.S. Appl. No. 13/402,756 (May 10, 2013).

Non-Final Office Action for U.S. Appl. No. 13/277,626 (Feb. 27, 2013).

Notification of Transmittal of the International Search Report and the Written Opinion of the International Searching Authority, or the Declaration for International Application No. PCT/US2012/026178 (Jul. 30, 2012).

Commonly-assigned, co-pending International Application No. PCT/US12/26178 for "Methods, Systems, and Computer Readable Media for Network Metadata Based Policy Control," (Unpublished, filed Feb. 22, 2012).

"About 3GPP: What is the difference between a SIM and a USIM? What is a UICC?," About http://www.3gpp.org/FAQ#outil_sommaire_58, pp. 1-11 (Copyright 2012).

"Smart Cards; Card Application Toolkit (CAT) (Release 10)," ETSI TS 102 223 V10.5.0, pp. 1-224 (Sep. 2011).

"3rd Generation Partnership Project; Technical Specification Group Services and System Aspects; Universal Geographical Area Description (GAD) (Release 10)," 3GPP TS 23.032, pp. 1-29 (Mar. 2011).

"3rd Generation Partnership Project; Technical Specification Group Services and System Aspects; Telecommunication management; Charging management; Diameter charging applications (Release 9)," 3GPP TS 32.299 V9.4.0, pp. 1-148 (Jun. 2010).

"3rd Generation Partnership Project; Technical Specification Group Core Network and Terminals; Policy and Charging Control over Rx reference point (Release 9)," 3GPP TS 29.214 V9.3.0, pp. 1-44 (Mar. 2010).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

"BICC Architecture and BICC Protocol Details," Tekelec, p. 28-41 (2008).

"BICC Signaling Router (BSR) Reference Architecture (WP005274)," Tekelec, p. 2-91 (2008).

Jennings et al., "Session Initiation Protocol (SIP) URIs for Application such as Voicemail and Interactive Voice Response (IVR)," The Internet Society, RFC 4458 (Apr. 2006).

"Interworking Between Session Initiation Protocol (SIP) and Bearer Independent Call Control Protocol or ISDN User Part," ITU-T Q.1912.5, p. 1-101 (Mar. 2004).

"Prepaid vs. Number Portability," Power Point presentation (publication date unknown; electronic file creation date Jul. 29, 2003.).

"Bearer Independent Call Bearer Control Protocol," ITU-T Q.1950, p. 1-96 (Dec. 2002).

Chang, "BICC Extension of SIP in Inter-Network Configuration," Internet Engineering Task Force, draft-chang-sipping-bicc-network-00.txt, pp. 1-17 (Mar. 2002).

Marshall et al., "SIP Extensions for Supporting Distributed Call State," SIP Working Group, Internet Draft, pp. 1-12 (Aug. 2001).

"Bearer Independent Call Control Protocol (Capability Set 2) and Signalling System No. 7 ISDN User Part: Formats and Codes," ITU-T Q.1902.3, p. 1-141 (Jul. 2001).

"Bearer Independent Call Control Protocol (Capability Set 2) and Signaling System No. 7 ISDN user part: General Functions of Messages and Parameters," ITU-T Q.1902.2 (Jul. 2001).

"Bearer Independent Call Control Protocol (Capability Set 2): Functional Description," ITU-T Q.1902.1, p. 1-23 (Jul. 2001).

"Bearer Independent Call Control Protocol," ITU-T Q.1901 (Jun. 2000).

Sugano et al., "Presence Information Data Format for IMPP," Internet draft, draft-ietf-impp-pidf-01.text, Network Working Group, pp. 1-17 (Mar. 10, 2000).

Liao et al., "SS7-TCAP/IP Interworking," Internet Engineering Task Force, pp. 1-14 (Mar. 1999).

De Ment, "The Evolution of Signaling," NMS Communications, p. 1-28 (Publication Date Unknown).

"Mobile Wireless Overview," Cisco IOS Mobile Wireless Configuration Guide, pp. MWC-1-MWC-8 (Publication Date Unknown).

Non-Final Office Action for U.S. Appl. No. 13/402,756 (Jun. 25, 2014).

Non-Final Office Action for U.S. Appl. No. 13/244,237 (Apr. 3, 2014).

Advisory Action Before the Filing of an Appeal Brief for U.S. Appl. No. 13/402,756 (Dec. 30, 2013).

(56) References Cited

OTHER PUBLICATIONS

Notice of Allowance and Fee(s) Due for U.S. Appl. No. 13/330,086 (Nov. 6, 2013).
Final Office Action for U.S. Appl. No. 13/402,756 (Sep. 19, 2013).
Notice of Allowance and Fee(s) Due for U.S. Appl. No. 13/277,626 (Aug. 20, 2013).
Communication of European publication number and information on the application of Article 67(3) EPC for European Application No. 12869126.8 (Dec. 3, 2014).
Notice of Allowance and Fee(s) Due for U.S. Appl. No. 13/402,756 (Nov. 20, 2014).
Notice of Allowance and Fee(s) Due for U.S. Appl. No. 13/244,237 (Oct. 16, 2014).
Final Office Action for U.S. Appl. No. 13/244,237 (Aug. 6, 2014).
Extended European Search Report for European Application No. 12869126.8 (Nov. 11, 2015).
Letter regarding Office Action for Japanese Patent Application No. 2014-558717 (Sep. 8, 2015).

* cited by examiner

EXEMPLARY RECEPTIVITY SERVICE SETTING / RULE DATA ⎫ 200

| SUBSCRIBER ID (e.g., IMSI, GUTI, URI) | RECEPTIVITY CONDITION 1 (e.g., DAY OF WEEK) | RECEPTIVITY CONDITION 2 (e.g., TIME OF DAY) | RECEPTIVITY CONDITION 3 (e.g., ROAMING STATUS) | RECEPTIVITY CONDITION 4 (e.g., TYPE OF COMMUNICATIONS THAT SUBSCRIBER IS WILLING TO RECEIVE) |
|---|---|---|---|---|
| SUB1 | Mon-Fri | 1:00pm - 5:00pm | * | Restaurant Ads |
| SUB1 | * | * | Out of Network | Hotel Ads |

EXEMPLARY RECEPTIVITY-BASED POLICY ENHANCEMENT PROFILE DATA ⎫ 202

| SUBSCRIBER ID (e.g., IMSI, GUTI, URI) | POLICY ENHANCEMENT 1 (e.g., GUARANTEED DL BITRATE) | MAXIMUM DURATION OF ENHANCEMENT 1 |
|---|---|---|
| SUB1 | +25% | * |

METHODS, SYSTEMS, AND COMPUTER READABLE MEDIA FOR PROVIDING USER RECEPTIVITY DRIVEN POLICY IN A COMMUNICATIONS NETWORK

PRIORITY CLAIM

This application claims the benefit of U.S. Provisional Patent Application Ser. No. 61/393,853 filed Oct. 15, 2010; the disclosure of which is incorporated herein by reference in its entirety.

TECHNICAL FIELD

The subject matter described herein relates to network policy. More specifically, the subject matter relates to methods, systems, and computer readable media for providing user receptivity driven policy in a communications network.

BACKGROUND

A policy and charging rules function (PCRF), or policy engine, at its most basic level, is a server that deploys a set of operator-created business rules in a communications network. These rules can be used to define how broadband network resources should be allocated to subscribers and applications and under what conditions. The PCRF is a policy decision point that may be centrally located in the network and communicates with access edge devices (e.g., policy enforcement points), applications, and operational support systems/business support systems (OSS/BSS) platforms to manage subscriber and network information according to the established rules. Policy rules encompass the business and technological rules that govern which network services a subscriber can access, at what bandwidth level, when, and for how long. Generally speaking, the PCRF queries, coordinates, and adjusts all of the network resources needed to provide the required services to individual, authorized subscribers. As such, the PCRF operates solely in the control plane and does not operate in the data plane. More specifically, the PCRF identifies appropriate policy rules by querying a subscription profile repository (SPR) and enforces them by sending them to, for example, a policy and charging enforcement function (PCEF).

Currently, network users have little or no control over the type of content (e.g., advertising, political solicitations, etc.) that they are willing to receive or the network policies that are applied to their communications. Instead, these rules may be determined by the network operator yet it may be desirable to allow users to have some control over the network policies that are applied to them.

Accordingly, in light of these difficulties, a need exists for improved methods, systems, and computer readable media for providing user receptivity driven policy in a communications network.

SUMMARY

Methods, systems, and computer readable media for providing user receptivity driven policy in a communications network are disclosed. One method includes storing subscriber preference information indicating a willingness of a subscriber to receive a first type of content as well as policy and charging enhancement information associated with the subscriber preference information. Content is received from a content provider. Based on the subscriber preference information, it is determined whether the subscriber is willing to receive the content. In response to determining that the subscriber is willing to receive the content, the content is communicated to the subscriber and a policy and charging rules function (PCRF) is communicated with for temporarily enhancing a network or charging policy of the subscriber based on the policy charging enhancement information.

Another exemplary method according to the subject matter described herein includes storing subscriber preference information indicating an attribute of willingness of a subscriber to receive a type of content. The method further includes generating a policy and charging rule based at least in part on the attribute of willingness of the subscriber to receive the content type. The method further includes communicating the policy and charging rule to a policy and charging enforcement function (PCEF).

Yet another method according to the subject matter described herein includes receiving media content of a first type for distribution to subscribers. The method further includes determining whether the media content should be distributed to a subscriber by accessing subscriber receptivity policy information indicating one or more attributes of willingness of a subscriber to receive media content of the first type. The method further includes in response to determining that the subscriber is willing to receive media content of the first type, distributing the media content to the subscriber.

A system for providing receptivity service in a communications network, the system includes a subscriber receptivity rules database for storing subscriber preference information indicating a willingness of a subscriber to receive a first type of content and for storing policy and charging enhancement information associated with the subscriber preference information. A receptivity rules server is configured to a receptivity rules server for receiving content of the first type from a content provider and determining, based on the subscriber preference information, if the subscriber is willing to receive the content. In response to determining that the subscriber is willing to receive the content, the receptivity rules server is configured to communicate the content to the subscriber and communicate with a policy and charging rules function (PCRF) for temporarily enhancing a network or charging policy of the subscriber based on the policy and charging enhancement information.

Another system according to the subject matter described herein includes a subscriber receptivity rules database for storing subscriber preference information indicating an attribute of willingness of a subscriber to receive a first type of content. The system further includes a policy and charging rules function (PCRF) for generating a policy and charging rule based at least in part on the attribute of willingness of the subscriber to receive the media content of the first type and for communicating the policy and charging rule to a policy and charging enforcement function (PCEF).

According to yet another aspect, the subject matter described herein includes a system for distributing media content to a subscriber in a communications network based on subscriber receptivity policy. The system includes a receptivity rules database for storing subscriber receptivity policy information indicating one or more attributes of willingness of a subscriber to receive media content of a first type. The system further includes a receptivity service content gateway for receiving media content of the first type for distribution to subscribers, for accessing the database to determine whether a subscriber is willing to receive the content of the first type, and for distributing the media content to the subscriber in response to determining that the subscriber is willing to receive the media content of the first type.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIG. 2 is a set of tables illustrating exemplary receptivity service rules and receptivity-based policy enhancement profile data that may be used for providing user receptivity driven policy in a communications network according to an embodiment of the subject matter described herein;

DETAILED DESCRIPTION

Figure 1:
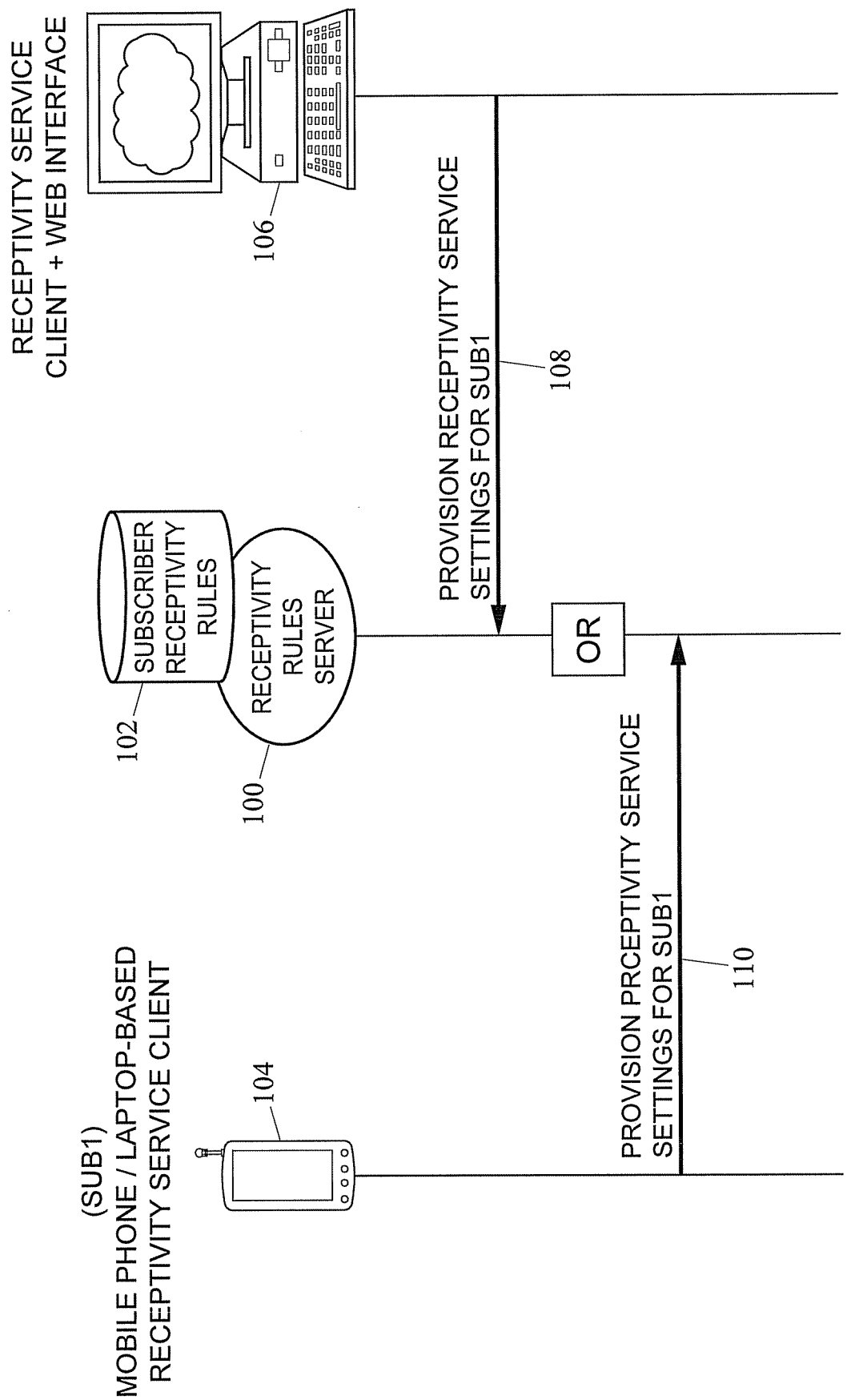
FIG. 1 is a network diagram illustrating an exemplary messaging scenario for provisioning receptivity service rules according to an embodiment of the subject matter described herein.

The subject matter disclosed herein includes systems and methods for providing user receptivity driven policy in a communications network. According to one aspect, a subscriber may specify a willingness or receptiveness to receive certain types of content (e.g., advertisements, solicitations, etc.) In response to the subscriber agreeing to receive certain types of content, a network operator is able to reward the subscriber with enhanced policy and charging rules/service flow quality of service (QoS).

In one, embodiment, a receptivity rules server may be configured to store subscriber preferences/settings/rules regarding the willingness of the subscriber to receive various types of content (e.g., advertising content, political solicitation advertising content, pollster solicitation content, charitable donation solicitation content). Receptivity rules may include any number of qualifying attributes such as: type of content (e.g., restaurant ads, hotel ads, movie ads), content media type (e.g., video, picture, text, audio), content delivery mode (e.g., via receptivity client connection, via text message service, via multimedia message service, via voice service, via instant message service, via email service), time of day, day of week, roaming status (e.g., only when in-network, only when roaming out of network, only when roaming in a specific roaming service provider), geo-location of subscriber (e.g., only when subscriber is within a specific geo-location coordinate range or proximity, only when subscriber is within a specific city, state, zip code, area code, only when subscriber is near a specific landmark (e.g., airport, shopping mall), subscriber presence status (e.g., only when presence status is "available").

A receptivity service content gateway (RCG) server may be configured to receive "content" (e.g., advertisements, solicitations) from various third party entities, businesses, or organizations. This content may be of various media types such as video, audio, text, and pictures. In one embodiment, the RCG receives and stores this content and in other embodiments the RCG may directly deliver the content without performing any caching. By storing received content, the RCG can receive content from a content provider at a time when the subscriber is either not in communication with the RCG server or not receptive to receiving the provided content. At some point later in time (e.g., when the subscriber logs in/connects to the RCG, or when the subscriber changes his/her receptivity preferences in the RRS) the RCG can provide that content to Sub1. For example, the RCG can be configured to maintain content provided by a content provider for 30 days and distribute this content to all subscribers with the appropriate receptivity settings for those 30 days. At the end of 30 days, the content is purged from the content storage DB at the RCG.

The content may be classified by either the content provider or the RCG according to a number of attributes including, but not limited to, content type (e.g., restaurant ad, hotel ad, movie ad, etc.), media type, geo-location relevance (e.g., only relevant to receptive subscribers at or near GPS coordinates X,Y, only relevant to receptive subscribers near the airport, etc.).

In one example, receptivity client software executed on a subscriber's handset may connect to the RCG and the RCG may identify receptivity preference rules associated with the subscriber and select and distribute appropriate content to the receptivity client software for display to the subscriber. The subscriber may also connect to the RCG server from a PC or laptop-based receptivity client and receive the same content. In yet another embodiment, a web browser (rather than the receptivity client) on the mobile phone or laptop/PC may be used to connect to the RCG and receive appropriate content.

Advantages of the subject matter described herein include the ability for a subscriber to increase his communications experience through enhanced policy and charging rules and QoS, which may include higher bandwidth or lower latency communications, lower fees, higher data caps, etc.

FIG. 1 is a network diagram illustrating an exemplary messaging scenario for provisioning receptivity service settings according to an embodiment of the subject matter described herein. Referring to FIG. 1, receptivity rules server (RRS) 100 may be configured to store subscriber preferences/settings/rules regarding the willingness (i.e., receptivity) of a subscriber to receive various types of content. For example, types of content may include advertising content, political solicitation ad content, pollster solicitation content, charitable donation solicitation content, etc. Associated with RRS 100 may be subscriber receptivity rules (SRR) database 102. Receptivity rules stored in SRR database 102 may include various attributes including a content type, content media type, content delivery mode, time, roaming status, geo-location, and presence status. The types of content may include restaurant ads, hotel ads, and movie ads. Content media types may include video, picture, text, and audio. Content delivery modes may include a receptivity client connection, a text message service, a multimedia message service, a voice service, an instant message service, and an email service. Time may include a time of day, day of week, etc. Roaming status may include only when in-network, only when roaming out of network, only when roaming in a specific roaming service provider, etc. Geo-location of subscriber may include only when the subscriber is within a specific geo-location coordinate range or proximity, only when the subscriber is within a specific city, state, zip code, area code, or only when subscriber is near a specific landmark (e.g., airport, shopping mall). Subscriber presence status may include when presence status is "available".

Receptivity rules stored in SRR database 102 may be provisioned by a subscriber to the receptivity service or by a third party on behalf of the subscriber. Provisioning may take place via a receptivity service client software application on a mobile or fixed communication terminal (e.g., smart phone, laptop or PC), or via a web interface. In one embodiment, a receptivity service client (not shown) may be installed on subscriber's mobile phone 104 which is adapted to communicate receptivity rules maintained by RRS 100.

FIG. 2 is a set of tables illustrating exemplary receptivity service rules and receptivity-based policy enhancement profile data that may be used for providing user receptivity driven policy in a communications network according to an embodiment of the subject matter described herein. Table 200 illustrates exemplary receptivity preference rules that may be stored in SRR database 102 for Subscriber 1. For example, table 200 may include a subscriber identifier and one or more receptivity conditions. The subscriber identifier may include an international mobile subscriber identity (IMSI), global unique temporary identifier (GUTI), uniform resource indicator (URI), or any other suitable identifier for identifying a subscriber within a communications network. Exemplary receptivity conditions may include day of week, time of day, roaming status, and type of communication that the subscriber is willing to receive. As shown, Sub1 is willing to receive restaurant ads between Monday and Friday and between 1 pm and 5 pm, as well as hotel ads at any time of day so long as he is roaming out of network. It may be appreciated that any number of receptivity conditions in addition to those shown may be associated with a subscriber without departing from the scope of the subject matter described herein.

Table 202 illustrates exemplary network policy enhancement rules that may be associated with Subscriber 1 in SRR database 102. In one embodiment, a network operator may provision a policy enhancement profile for Subscriber 1 in response to the willingness of Subscriber 1 to receive certain types of content. In the example shown, as a result of the receptivity preference rules specified by Subscriber 1 in table 200, the network operator may enhance Subscriber 1's network QoS policy by granting Subscriber 1 an additional 25% guaranteed download bitrate capacity for an unlimited time.

Figure 3:
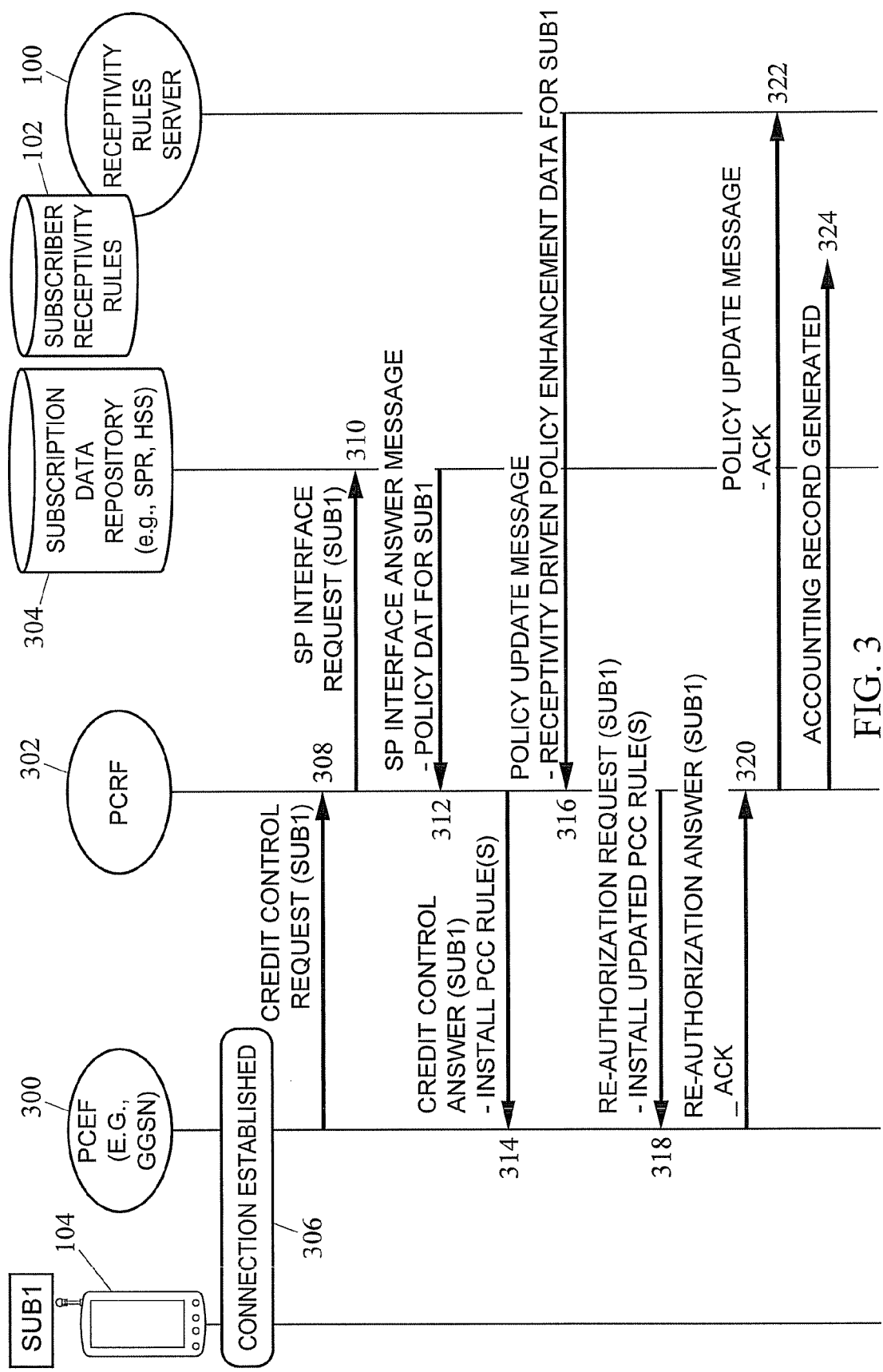
FIG. 3 is a network diagram where the receptivity rules server stores receptivity rules in a receptivity rules database and where the rules are used for providing user receptivity driven policy in a communications network according to an embodiment of the subject matter described herein.

FIG. 3 is a network diagram where receptivity rules server 100 is adapted to store receptivity rules in receptivity rules database 102 and where the rules are used for providing user receptivity driven policy in a communications network according to an embodiment of the subject matter described herein. Specifically, FIG. 3 shows RRS 100 configured to store receptivity service rules for Subscriber 1 in SRR database 102. Additionally shown are PCEF 300 for enforcing policy rules, PCRF 302 for querying, coordinating, and adjusting network resources needed to provide services to subscribers, and a subscription data repository (SDR) 304, such as a subscription profile repository (SPR) or home subscriber server (HSS), for storing subscriber profile information.

Referring to the message flow in FIG. 3, in step 306, Subscriber 1 establishes a data connection (default or dedicated bearer) to PCEF 300. In step 308, PCEF 300 may signal PCRF 302 requesting policy and charging rule(s) for Sub1. The request 308 may be made on the Gx interface using a Diameter credit control request (CCR) message. Next, in step 310, PCRF 302 receives CCR message 308 and accesses a subscription data repository 304 to obtain policy and charging rule information for Sub1 in Sp interface answer message 312. In this example, the policy and charging rule information may include subscriber receptivity information stored in database 102 that indicates the willingness of a subscriber to receive content of a type requested in the SP interface request message. Using the obtained policy and charging information, PCRF 302 generates one or more policy control and charging (PCC) rules and installs them on PCEF 300 via credit control answer (CCA) message 314. In this example, the PCC rules may indicate the willingness of the subscriber to receive content of a particular type.

In step 316, RRS 100 signals PCRF 302 with policy and charging enhancement information for Sub1 using a policy update message that includes receptivity driven policy enhancement data for Sub1. RRS 100 may be notified of the connection establishment of Sub1 (not shown for simplicity). PCEF 300, PCRF 302, BBERF (not shown), mobility management entity (MME) (not shown), or other network entity may provide this notification if required.

In response to receiving the policy and charging rule enhancement information for Sub1 from RRS 100, in step 318, PCRF 302 may generate one or more policy control and charging (PCC) rules and install the rule(s) on PCEF 300 via a re-authorization request (RAR) message. Re-authorization answer acknowledgement message 320 and policy update acknowledgement message 322 may be sent to PCRF 302 and RRS 100, respectively. In step 324, PCRF 302 (and/or RRS 100) may generate an accounting record indicating the policy and charging rule enhancement event.

Figure 4:
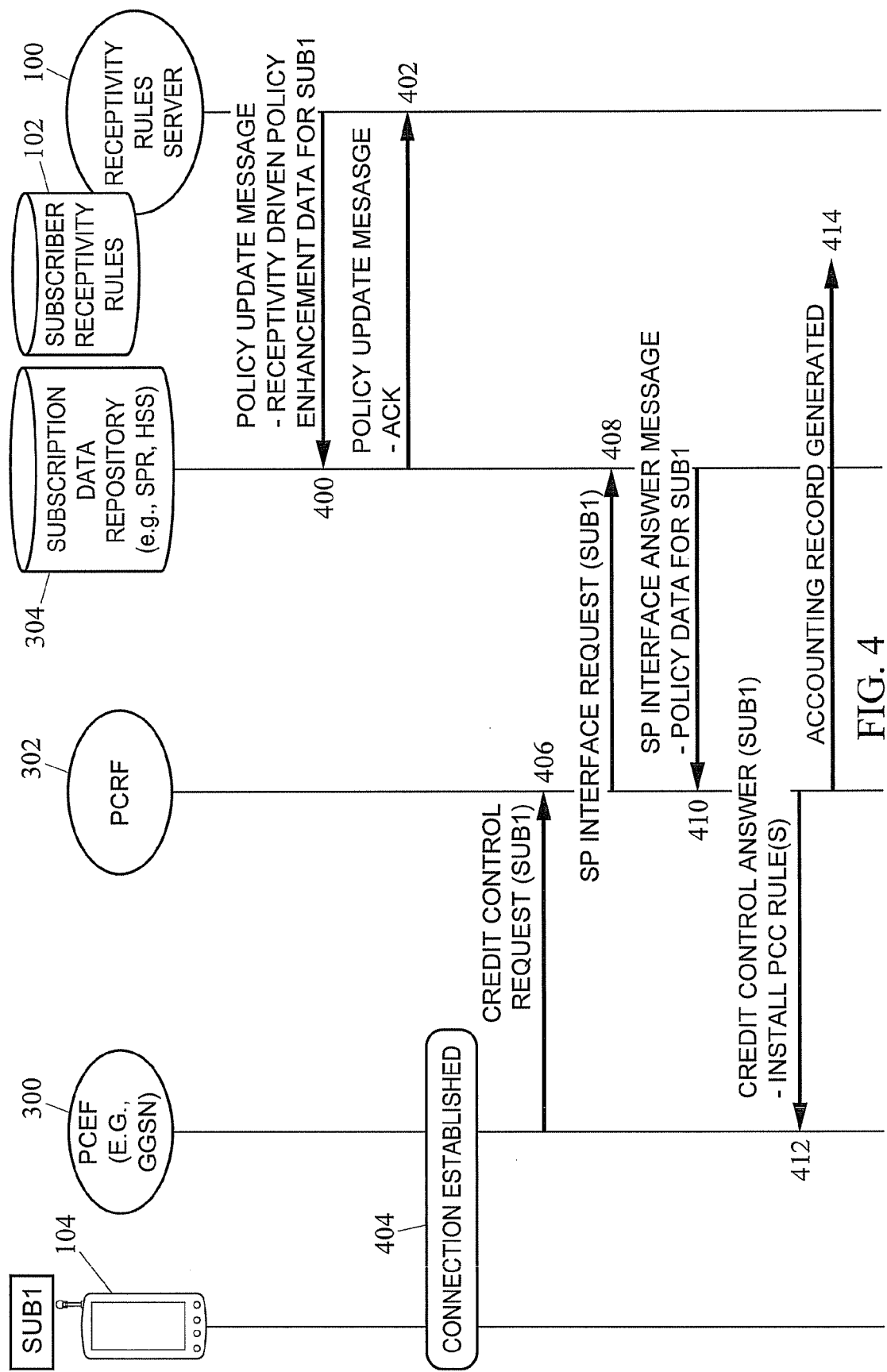
FIG. 4 is a network diagram where a receptivity rules server (RRS is adapted to send network policy enhancement information to a subscription profile repository/home subscriber server (SPR/HSS) for illustrating an exemplary messaging scenario for providing user receptivity driven policy in a communications network according to an embodiment of the subject matter described herein.

FIG. 4 is a network diagram where the RRS sends network policy enhancement information to an SPR/HSS for providing user receptivity driven policy in a communications network according to an embodiment of the subject matter described herein. For example, RRS 100 may be configured to store receptivity service rules for Subscriber 1 and provide policy and charging rule/rule enhancement information for Sub1 to SDR 304.

Referring to the message flow illustrated in FIG. 4, in step 400, RRS 100 sends a policy update message including receptivity driven policy enhancement data for Sub1 to SDR 304 and, in step 402, SDR 304 acknowledges the policy update message. As with the example in FIG. 3, receptivity driven policy enhancement information may include information for enhancing the subscriber's network access or other policies. In step 404, Subscriber 1 establishes a data connection (default or dedicated bearer connection) to PCEF 300. In step 406, PCEF 300 signals PCRF 302, requesting policy and charging rule(s) for Sub1. For example, request 406 may be made on the Gx interface using a Diameter CCR message. In steps 408 and 410, PCRF 302 receives the CCR message and accesses a subscription data repository 304 to obtain policy and charging rule information for Sub1. The obtained policy and charging rule information may include information that indicates the willingness of a subscriber to receive content of a particular type. Using the obtained policy and charging information, in step 412, PCRF 302 generates one or more PCC rules and installs them on PCEF 300 via a CCA message. In step 414, PCRF 302 (and/or RRS 100 or SDR 304) generates an accounting record indicating the policy and charging rule/rule enhancement event.

Figure 5:
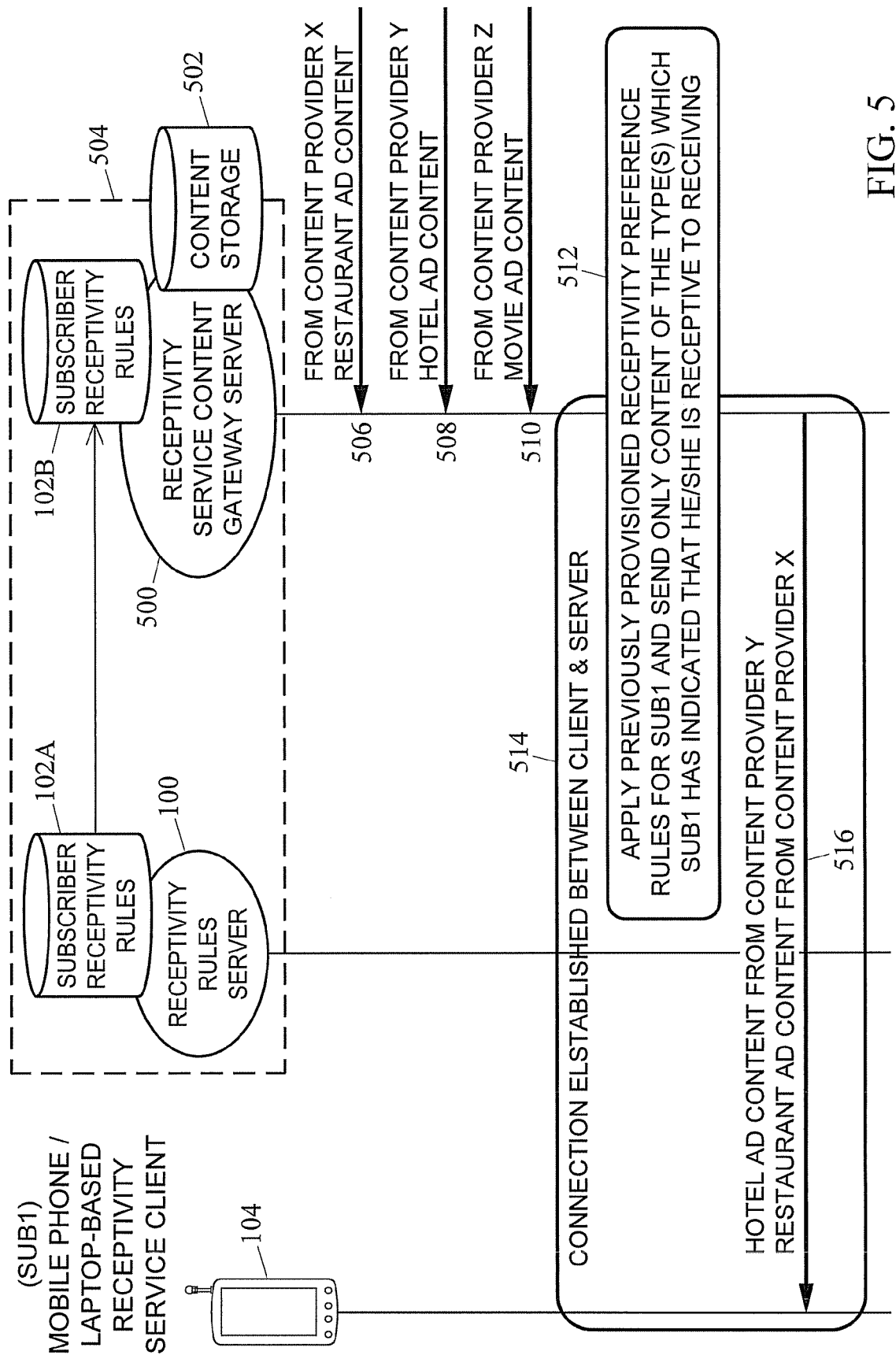
FIG. 5 is a network diagram where a receptivity service content gateway (RCG) maintains a synchronized/duplicate copy of subscriber receptivity settings and stores received content for providing user receptivity driven policy in a communications network according to an embodiment of the subject matter described herein.

FIG. 5 is a network diagram where a receptivity service content gateway server (RCG) maintains a synchronized/duplicate copy of subscriber receptivity settings and stores content used for providing user receptivity driven policy in a communications network according to an embodiment of the subject matter described herein. In FIG. 5, RRS 100 and RCG 500 may be combined/co-located to form RRS/RCG 504. Additionally, SRR database 102 may be split into SRR databases 102A and 102B which may include duplicate and/or synchronized receptivity rules. In this embodiment, RRS 100 may provide RCG 500 with access to receptivity rules for Sub1. RCG 500 may maintain a synchronized and/or duplicate copy of the subscriber receptivity rules or may simply access rules that are maintained by RRS 100. It will be appreciated that the functionality of RRS 100 and RCG 500 may be implemented on separate servers or may be implemented on the same server.

RCG 500 may be configured to receive "content" (e.g., advertisements, solicitations, etc.) from various third party entities such as businesses or other organizations. As mentioned above, this content may include media types such as video, audio, text, and pictures. In one embodiment, RCG 500 receives and stores this content. The content may be classified by either the content provider or RCG 500 according to a number of attributes including, but not limited to, content type (e.g., restaurant ad, hotel ad, movie ad, etc.), media type, geo-location relevance (e.g., only relevant to receptive subscribers at or near GPS coordinates X,Y, only relevant to receptive subscribers near the airport, etc.).

In this example, when receptivity client software (not shown) located on Sub1's handset 104 connects to RCG 500, RCG 500 identifies receptivity preference rules associated with Sub1 and selects and distributes the appropriate content to receptivity client software for display to the Sub1. It may be appreciated that in addition to using a mobile phone, Sub1 could also connect to RCG 500 server from a PC or laptop-based receptivity client and receive the same content via type of connection. In an alternate embodiment, a web browser on mobile phone or PC 104 could be used to connect to RCG 500 and receive appropriate content.

In the exemplary scenario shown, content may be received by RCG 500 from multiple content providers. Specifically, RCG 500 may receive restaurant advertising content from content provider X in content message 506, hotel advertising content from content provider Y in content message 508, and movie advertising content from content provider Z in content message 510. In step, 512, RCG 500 may then apply the previously provisioned receptivity preference rules stored in SRR database 102B and send only content of the type(s) that the subscriber has indicated they are willing to receive. In step 514, a connection is established between mobile client 104 and RCG 500. Finally, in this example it is assumed that Sub1 has indicated that they are willing to receive hotel and restaurant ad content but not movie ad content. As such, in step 516, RCG 500 only sends hotel ad content from provider Y and restaurant ad content from provider X to client 104.

Figure 6:
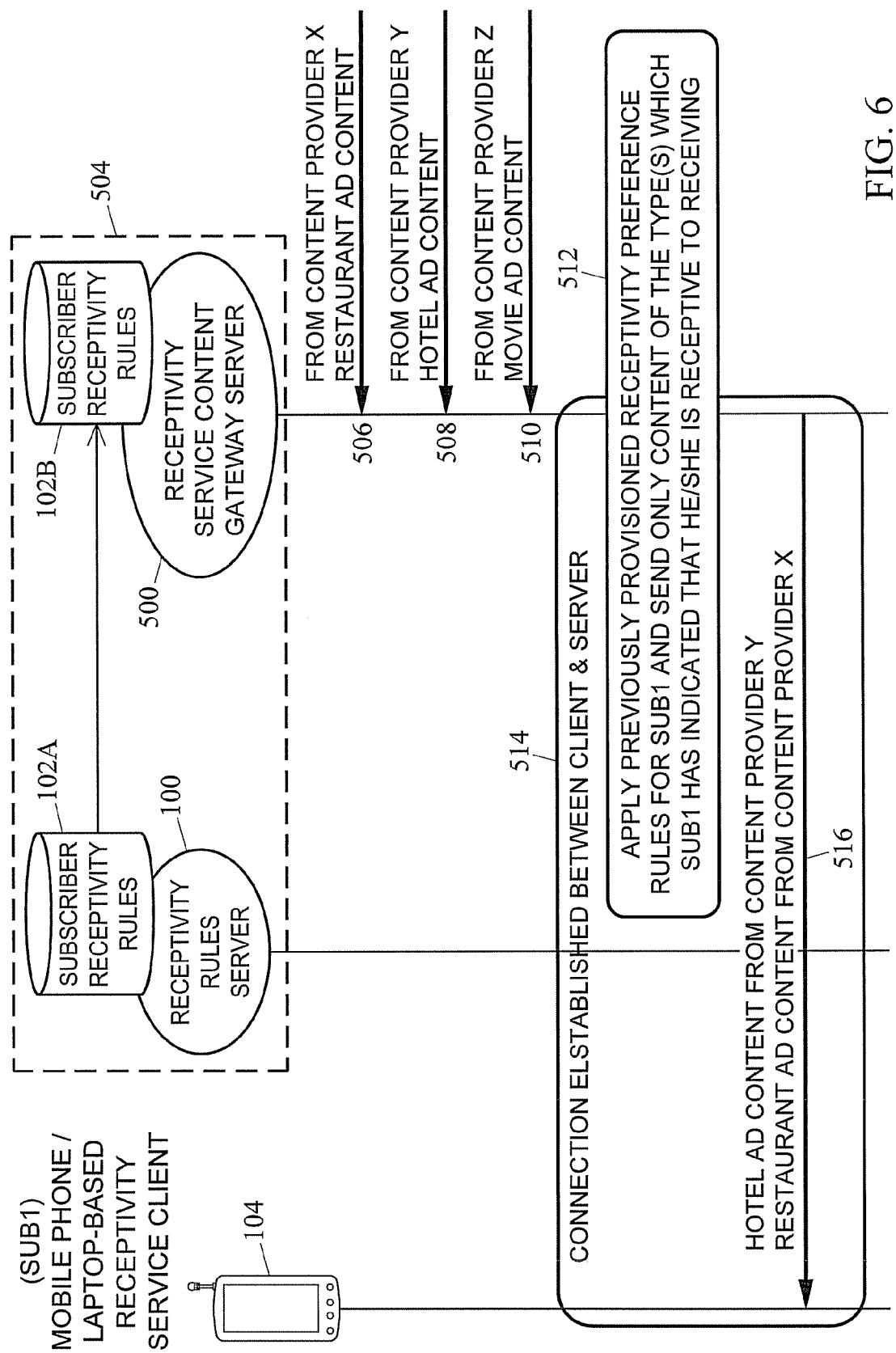
FIG. 6 is a network diagram where the RCG maintains a synchronized/duplicate copy of subscriber receptivity settings and does not store the received content used for providing user receptivity driven policy in a communications network according to an embodiment of the subject matter described herein.

FIG. 6 is a network diagram where the RCG maintains a synchronized/duplicate copy of subscriber receptivity settings without storing content illustrating an exemplary messaging scenario for providing user receptivity driven policy in a communications network according to an embodiment of the subject matter described herein. In this embodiment, RRS 100 is adapted to share RCG 500 with access to receptivity rules for Sub1. RCG 500 may maintain a synchronized or duplicate copy of the subscriber receptivity preferences or may access such rules that are maintained by RRS 100. It will be appreciated that the functionality of RRS 100 and RCG 500 may be implemented on separate servers or may be implemented on the same server without departing from the scope of the subject matter described herein.

RCG 500 may receive content (e.g., advertisements, solicitations, etc.) from various third party entities, businesses, and organizations. In this embodiment, RCG 500 receives and immediately distributes this content to all "connected" subscribers that have previously indicated receptiveness to such content (i.e., subscribers that have the appropriate receptivity rules specified). The content may be classified by either the content provider or RCG 500 according to a number of attributes including, but not limited to, content type (e.g., restaurant ad, hotel ad, movie ad, etc.), media type, geo-location relevance (e.g., only relevant to receptive subscribers at or near GPS coordinates <X,Y> only relevant to receptive subscribers near the airport, etc.).

In this example, if the receptivity client software (not shown) on Sub1's handset 104 is connected to RCG 500 server at the time that the content is received at RCG 500 from the content providers, the content may be distributed by RCG 500 to subscribers whose receptivity preference rules indicate a willingness to receive those types of content.

Thus, in the exemplary scenario shown, content may be received by RCG 500 from multiple content providers. Specifically, RCG 500 may receive restaurant advertising content from content provider X in content message 506, hotel advertising content from content provider Y in content message 508, and movie advertising content from content provider Z in content message 510. In step, 512, RCG 500 may then apply the previously provisioned receptivity preference rules stored in SRR database 102B and send only content of the type(s) that the subscriber has indicated they are willing to receive. At step 514, a connection is established between mobile client 104 and RCG 500. Finally, in this example it is assumed that Sub1 has indicated that they are willing to receive hotel and restaurant ad content but not movie ad content. As such, at step 516, RCG 500 only sends hotel ad content from provider Y and restaurant ad content from provider X to client 104.

Figure 7A:
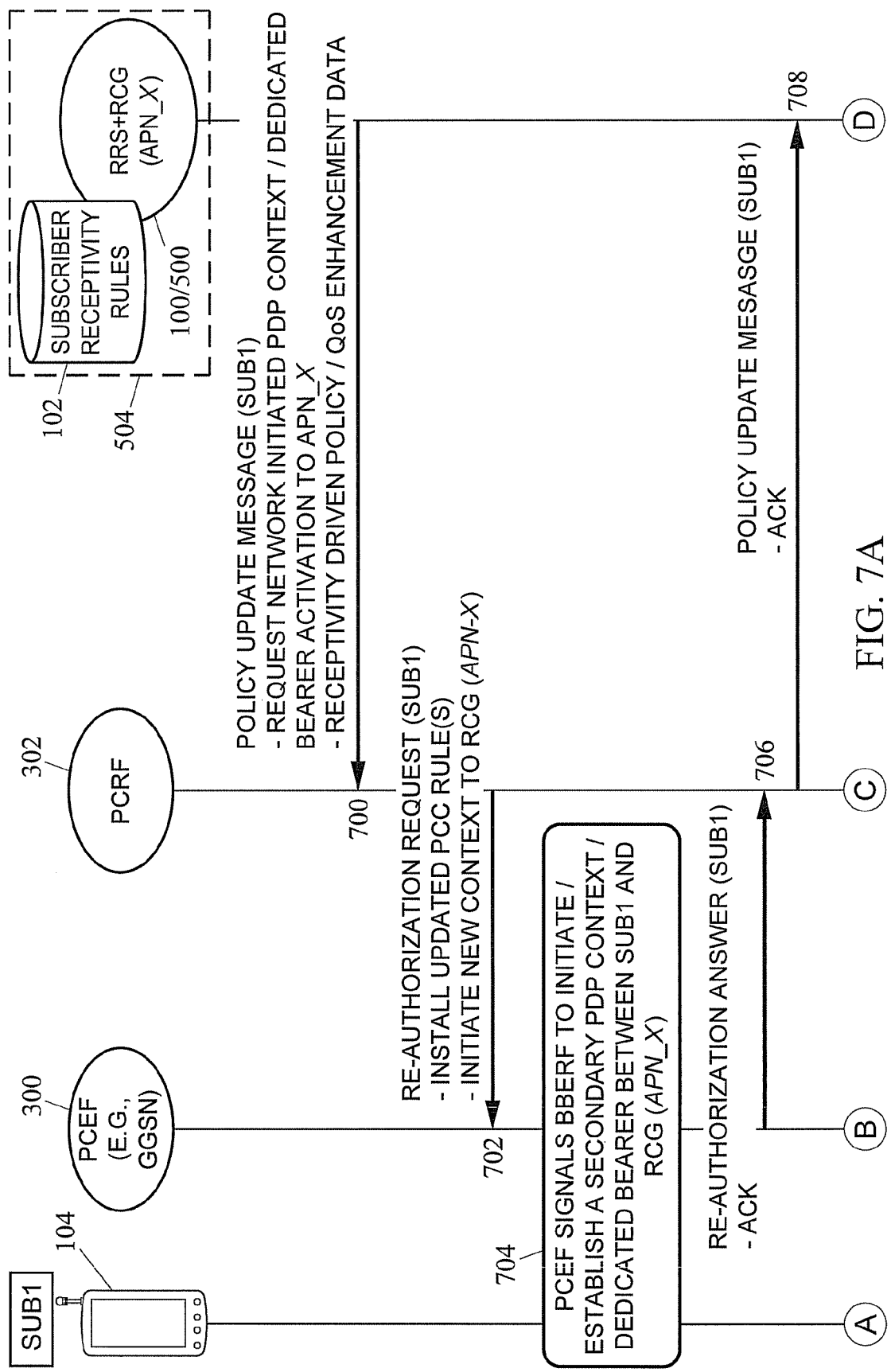
FIGS. 7A and 7B are network diagrams illustrating an exemplary messaging scenario where a combined RRS/RCG is adapted to cause a PCRF to trigger the establishment of a secondary PDP context/dedicated bearer connection for providing user receptivity driven policy in a communications network according to an embodiment of the subject matter described herein.
Figure 7B:
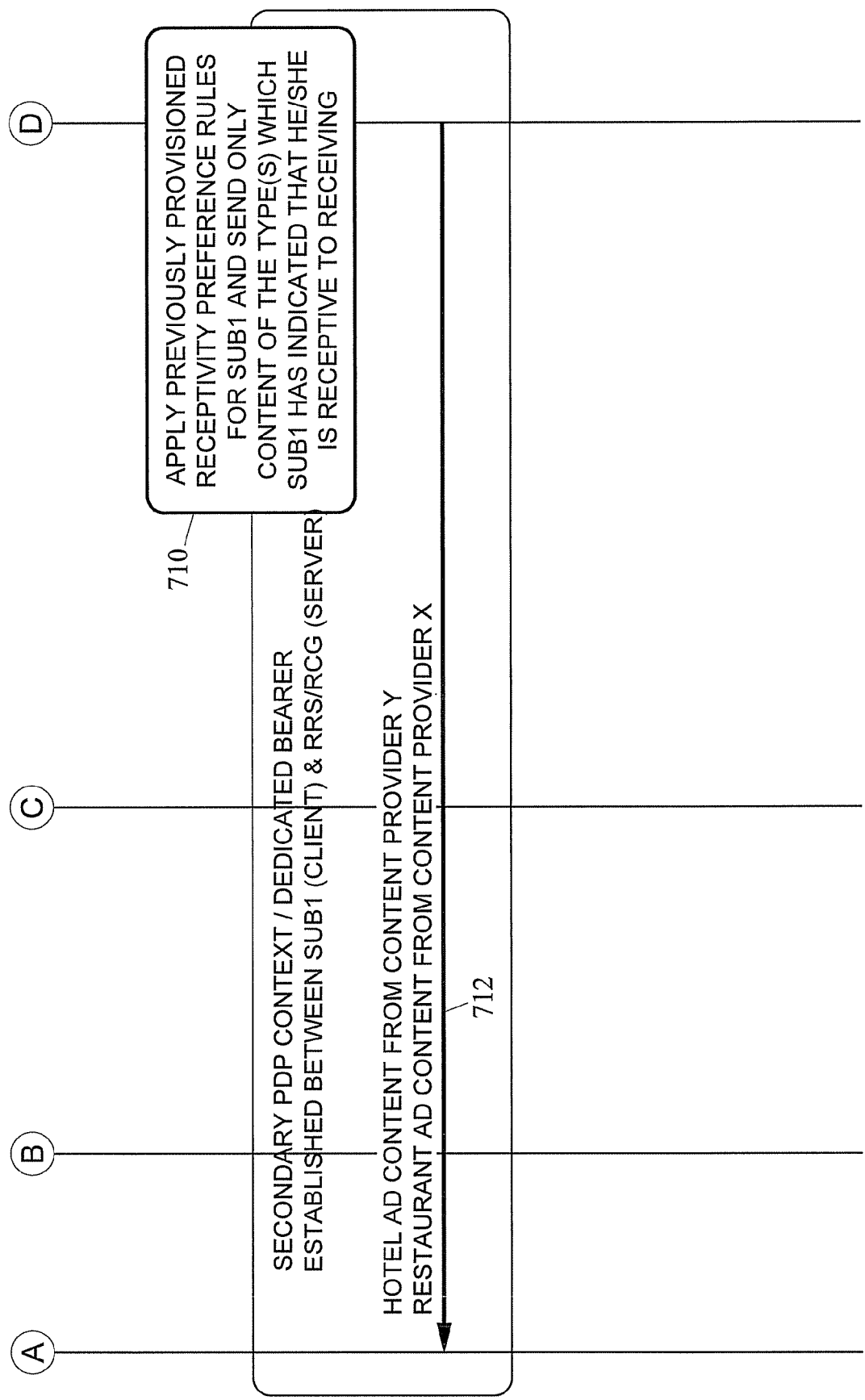

FIGS. 7A and 7B are a network diagram illustrating an exemplary messaging scenario where a combined RRS/RCG is adapted to cause a PCRF to trigger the establishment of a secondary PDP context/dedicated bearer connection for providing user receptivity driven policy in a communications network according to an embodiment of the subject matter described herein. In this example, RRS/RCG 504 may be configured to cause PCRF 302 to trigger the establishment of a network initiated secondary PDP context/dedicated bearer connection between Sub1 and RRS/RCG 504.

For example, in step 700, RRS/RCG 504 may signal PCRF 302 requesting that PCRF 302 trigger PCEF 300 to establish a secondary PDP context/dedicated bearer connection between RRS/RCG 504 and receptivity service client software (not shown) associated with Sub1 104. In step 702, PCRF 302 may send an RAR message to PCEF 300 for installing updated PCC rules for Sub1 and initiating a new context to RCG 504 for APN_X. In step 704, PCEF 300 may signal a BBERF (not shown) to establish a secondary PDP context or dedicated bearer connection between Sub1 and RCG 504. In step 706, PCEF 300 may return a RAA message for Sub1 to PCRF 302 and, in step 708, PCRF 302 may send a policy update acknowledgement message for Sub1 to RCG 504. Additionally, PCRF 302 (and/or RRS or SPR/HSS) may be configured to generate an accounting record indicating the temporary enhancement of network policy (aka rule enhancement event).

Figure 8:
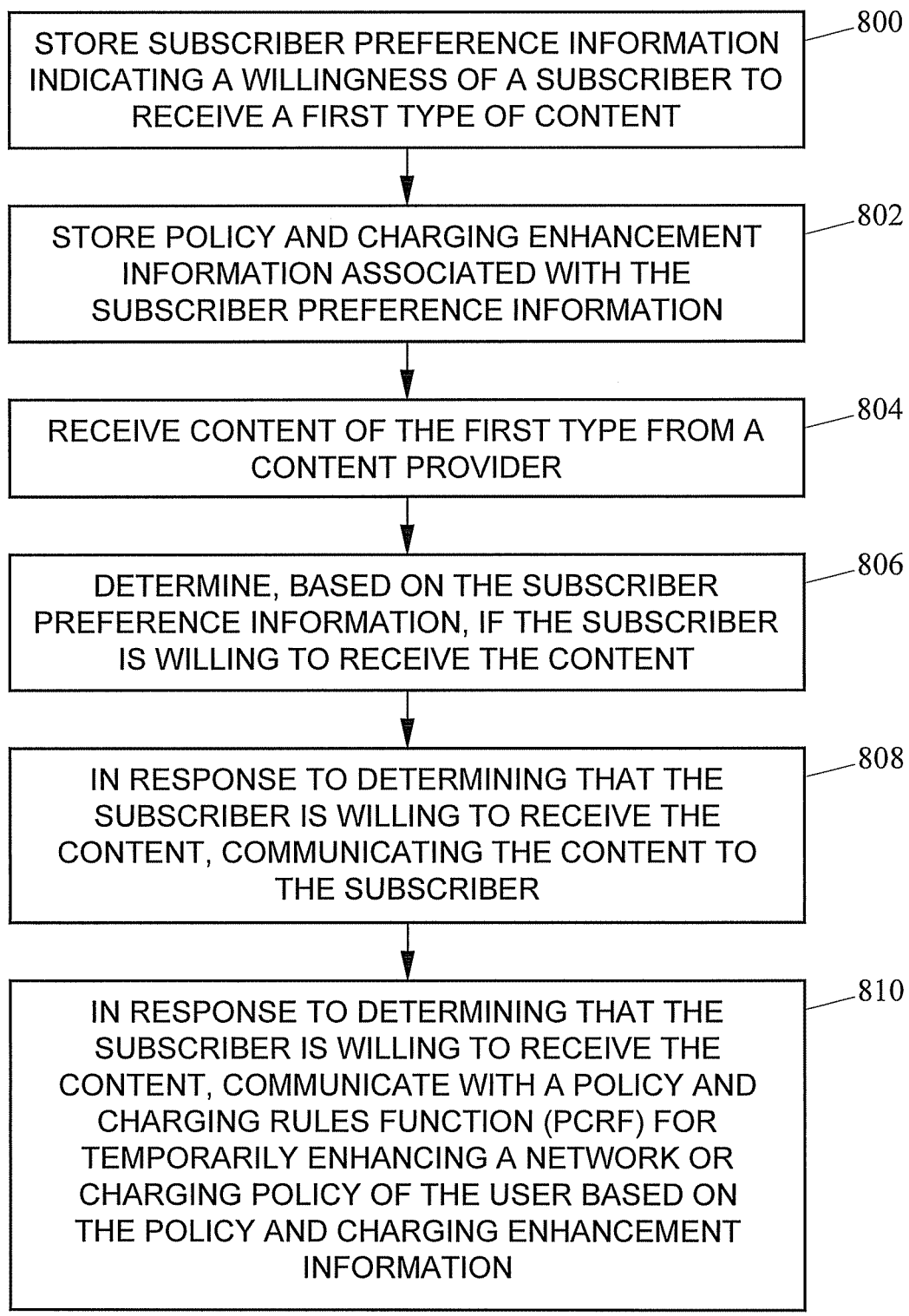
FIG. 8 is a flow chart illustrating exemplary steps for providing user receptivity driven policy in a communications network according to an embodiment of the subject matter described herein.

FIG. 8 is a flow chart illustrating exemplary steps for providing user receptivity driven policy in a communications network according to an embodiment of the subject matter described herein. Referring to FIG. 8, at step 800, subscriber preference information indicating a willingness of a subscriber receiving a first type of content is stored. For example, exemplary receptivity rules 200 may include a time of day or day of the week condition, a roaming status condition, and a media type condition which is indexed by one or more subscriber identifiers. Thus, subscriber preference information may indicate a willingness of Sub1 to receive restaurant-related advertisements between 1 pm and 5 pm from Monday to Friday.

In step 802, policy and charging enhancement information associated with the subscriber preference information is stored. The policy and charging enhancement information may include one or more network parameters, attributes, or policies that may be adjusted, for example, by applying one or more PCC rules using a PCRF and PCEF. The policy and charging enhancement information may also include a maximum duration for the temporary network enhancement event. For example, exemplary policy and charging enhancement information 202 for Sub1 may include an increase in a guaranteed download bitrate of 25%.

In step 804, content of the first type is received from a content provider. For example, an image-based advertisement for a restaurant may be received by RCG 500 from content provider X 506.

In step 806, it is determined, based on the subscriber preference information, whether the subscriber is willing to receive the content. For example, RRS 100 and/or RCG 500 may perform a lookup in SRR database 102 based on the target subscriber's identifier and retrieve subscriber preference information indicating whether the subscriber is willingness to receive the restaurant-related advertising content.

In step 808, if the subscriber is willing to receive the content, the content is communicated to the subscriber. As mentioned above, if other criteria are also satisfied (i.e., between M-F and 1-5 pm), then Sub1 is willing to receive the content. Therefore, the content may be delivered by any suitable means to the subscriber's device. This may be a mobile phone, PC, laptop, etc. and may use different protocols or formats depending on the type of content to be delivered.

In step 810, if the subscriber is willing to receive the content, a PCRF is communicated with in order to temporarily enhance a network policy associated with the user based on the policy and charging enhancement information. For example, temporarily enhancing one or more attributes of a network policy may include increasing one of: a guaranteed download bitrate, a maximum download bitrate, a permitted service flow, a permitted quality of service (QoS) class, a permitted access point name (APN), a permitted destination IP address, a permitted destination port number, or a download quota. Temporarily enhancing a charging rule may include reducing the price per minute for calls, per megabyte downloaded for data, or per SMS message. In the scenario described above, Sub1 may receive a 25% increase in his guaranteed download bit rate. In one embodiment, communicating with PCRF 302 may include communicating at least some of the policy and charging enhancement information to PCRF 302. For example, policy and charging rule information for Sub1 may be communicated to PCRF 302 using an Sp interface answer message, though other suitable message types may be used without departing from the scope of the subject matter described herein.

Figure 9:
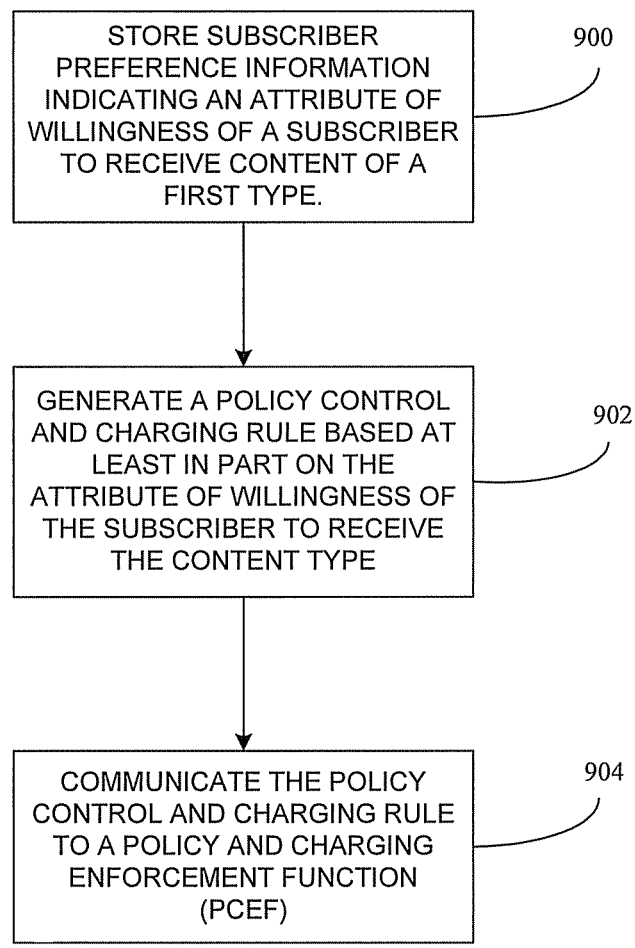
FIG. 9 is a flow chart illustrating exemplary steps for generating user receptivity driven policy rules according to an embodiment of the subject matter described herein.

FIG. 9 is a flow chart illustrating exemplary steps that may be performed by a receptivity rules server and/or a receptivity service content gateway server for providing user receptivity driven policy according to an embodiment of the subject matter described herein. Referring to FIG. 9, in step 900, subscriber preference information indicating an attribute of willingness of a subscriber to receive a particular type of content is stored. For example, RRS/RCG 504 may store subscriber receptivity rules in database 102. In step 902, a policy control and charging rule is generated based at least in part on an attribute of willingness of the subscriber to receive content of a particular type. For example, PCRF 302 may generate a PCC rule based on information received from RRS/RCG 504. In step 904, the PCC rule is communicated to a PCEF. For example, in FIG. 3, PCRF 302 may communicate the PCC rule to PCEF 300.

Figure 10:
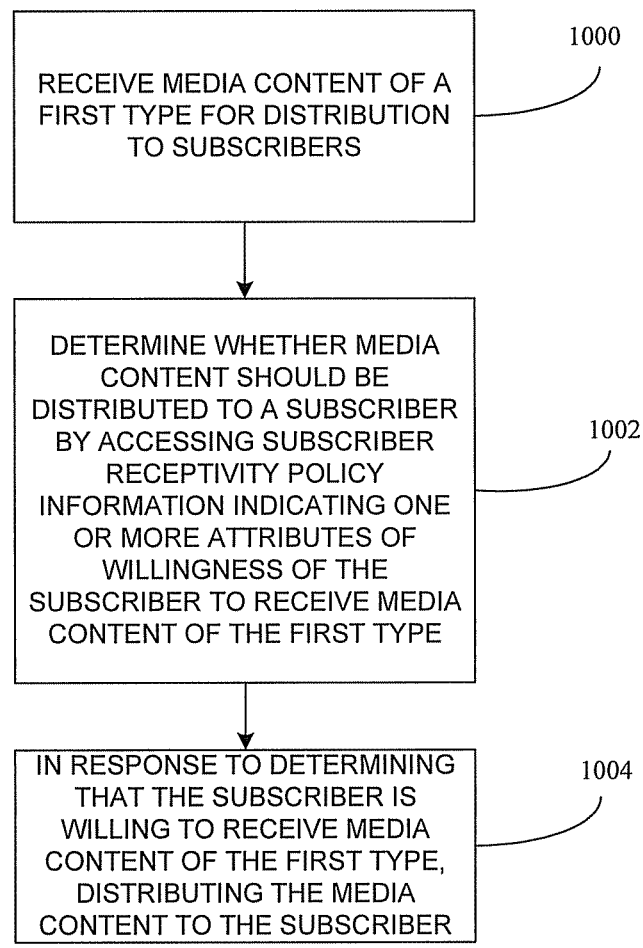
FIG. 10 is a flow chart illustrating exemplary steps for distributing media content based on user receptivity driven policy rules according to an embodiment of the subject matter described herein.

FIG. 10 is a flow chart illustrating exemplary steps that may be performed by RRS/RCG 504 in distributing media content based on user receptivity rules. Referring to FIG. 10, in step 1000, media content of a first type is received, where the media content is indicated for distribution to subscribers. For example, RRS/RCG 504 may receive advertising or other type of media content for distribution to plural subscribers, such as subscribers within a geographic area or who are under contract with a particular service provider. In step 502, it is determined whether the media content should be distributed to a particular subscriber by accessing subscriber receptivity policy information indicating one or more attributes of willingness of the subscriber to receive the media content of the first type. For example, RRS/RCG 504 may access database 102 to determine whether a given subscriber has indicated a willingness to receive the media content of the particular type. In step 506, in response to determining that the subscriber is willing to receive the media content of the first type, the media content is distributed to the subscriber. For example, RRS/RCG 504 may distribute the ads to willing subscribers.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing user receptivity driven policy in a communications network, the method comprising:
    storing subscriber preference information indicating an attribute of willingness of a subscriber to receive a first type of advertisement content from among multiple types of advertisement content, wherein the subscriber preference information indicates a willingness of the subscriber to receive the advertisement content based on one of a type of content, media type, delivery mode, time of day, day of week, roaming status, geo-location of the subscriber, and subscriber presence status;
    generating, by a policy and charging rules function (PCRF), a policy and charging rule based at least in part on the attribute of willingness of the subscriber to receive the advertisement content of the first type, wherein the policy and charging rule includes policy enhancement information for enhancing a quality of service (QoS) related attribute, wherein the policy enhancement information is provisioned by a network operator in response to the willingness of the subscriber to receive the first type of advertisement content;
    communicating the policy and charging rule to a policy and charging enforcement function (PCEF);
    receiving advertisement content of the first type from a content provider; determining, based on the subscriber preference information, if the subscriber is willing to receive the advertisement content; and
    in response to determining that the subscriber is willing to receive the advertisement content:
        communicating the advertisement content to the subscriber; and
        communicating with the PCRF for temporarily enhancing a network or charging policy of the subscriber based on the policy enhancement information.

2. The method of claim 1 wherein communicating with the PCRF for temporarily enhancing a network or charging policy includes communicating at least some of the policy and charging enhancement information to the PCRF.

3. The method of claim 1 wherein temporarily enhancing the network or charging policy includes increasing one of a guaranteed download bitrate, a maximum download bitrate, a permitted service flow, a permitted quality of service (QoS) class, a permitted access point name (APN), a permitted destination IP address, a permitted destination port number, and a download quota.

4. The method of claim 1 comprising storing the received advertisement content.

5. The method of claim 4 comprising purging the stored advertisement content after a predetermined time period.

6. The method of claim 1 comprising classifying the advertisement content by one of the content provider or a network operator.

7. A system for providing receptivity service in a communications network, the system comprising:
    a subscriber receptivity rules database for storing subscriber preference information indicating an attribute of willingness of a subscriber to receive advertisement media content of a first type from among multiple types of advertisement content, wherein the subscriber preference information indicates a willingness of the subscriber to receive the advertisement media content based on one of a type of content, media type, delivery mode, time of day, day of week, roaming status, geo-location of the subscriber, and subscriber presence status;
    a policy and charging rules function (PCRF) for generating a policy and charging rule based at least in part on the attribute of willingness of the subscriber to receive the advertisement media content of the first type and for communicating the policy and charging rule to a policy and charging enforcement function (PCEF), wherein the policy and charging rule includes policy enhancement information for enhancing a quality of service (QoS) related attribute, wherein the policy enhancement information is provisioned by a network operator in response to the willingness of the subscriber to receive the advertisement media content of the first type; and
    a receptivity service content gateway server for:
        receiving the advertisement media content of the first type from a content provider;
        determining, based on the subscriber preference information, if the subscriber is willing to receive the advertisement media content;
        in response to determining that the subscriber is willing to receive the advertisement media content:
            communicating the advertisement media content to the subscriber; and
            communicating with the PCRF for temporarily enhancing a network or charging policy of the subscriber based on the policy and charging enhancement information.

8. The system of claim 7 wherein the receptivity service content gateway server is configured to communicate at least some of the policy and charging enhancement information to the PCRF.

9. The system of claim 7 wherein the PCRF installs the policy and charging rule at the PCEF wherein the policy and charging rule is based on the policy and charging enhancement information.

10. The system of claim 7 wherein the receptivity service content gateway server is configured to increase one of a guaranteed download bitrate, a maximum download bitrate, a permitted service flow, a permitted quality of service (QoS) class, a permitted access point name (APN), a permitted destination IP address, a permitted destination port number, and a download quota.

11. The system of claim 7 wherein the receptivity service content gateway server is configured to store the received advertisement content.

12. The system of claim 11 wherein the receptivity service content gateway server is configured to purge the stored advertisement content after a predetermined time period.

13. The system of claim 11 wherein the content is classified by one of the content provider or a network operator.

14. A non-transitory computer readable medium comprising computer executable instructions that when executed by a processor of a computer control the computer to perform steps comprising:
    storing subscriber preference information indicating an attribute of willingness of a subscriber to receive a first type of advertisement content from among multiple types of advertisement content, wherein the subscriber preference information indicates a willingness of the subscriber to receive the advertisement content based on one of a type of content, media type, delivery mode, time of day, day of week, roaming status, geo-location of the subscriber, and subscriber presence status;

generating, by a policy and charging rules function (PCRF), a policy and charging rule based at least in part on the attribute of willingness of the subscriber to receive the advertisement content of the first type, wherein the policy and charging rule includes policy enhancement information for enhancing a quality of service (QoS) related attribute, wherein the policy enhancement information is provisioned by a network operator in response to the willingness of the subscriber to receive the first type of advertisement content;

communicating the policy and charging rule to a policy and charging enforcement function (PCEF);

receiving advertisement content of the first type from a content provider; determining, based on the subscriber preference information, if the subscriber is willing to receive the advertisement content; and in response to determining that the subscriber is willing to receive the advertisement content:
  communicating the advertisement content to the subscriber; and
  communicating with the PCRF for temporarily enhancing a network or charging policy of the subscriber based on the policy enhancement information.

* * * * *